US005673320A

United States Patent [19]

[11] Patent Number: 5,673,320

Ray et al.

[45] Date of Patent: Sep. 30, 1997

[54] METHOD AND APPARATUS FOR IMAGE-BASED VALIDATIONS OF PRINTED DOCUMENTS

[75] Inventors: Lawrence A. Ray; Richard N. Ellson, both of Rochester, N.Y.

[73] Assignee: Eastman Kodak Company, Rochester, N.Y.

[21] Appl. No.: 392,713

[22] Filed: Feb. 23, 1995

[51] Int. Cl.[6] .................... H04L 9/00

[52] U.S. Cl. .................... 380/25; 380/9; 380/23; 380/24; 380/30; 380/49; 380/50; 380/54; 283/17; 283/57; 283/58; 283/59; 283/73

[58] Field of Search .................... 380/23, 24, 25, 380/30, 49, 50, 54, 9; 340/825.31; 283/17, 73, 57, 58, 59

[56] References Cited

U.S. PATENT DOCUMENTS

| | | | |
|---|---|---|---|
| 3,569,619 | 3/1971 | Simjian | 235/380 |
| 4,879,747 | 11/1989 | Leighton et al. | 380/23 |
| 4,908,861 | 3/1990 | Brachtl et al. | 380/25 |
| 4,972,476 | 11/1990 | Nathans | 380/23 |
| 5,157,726 | 10/1992 | Merkle et al. | 380/23 |
| 5,321,751 | 6/1994 | Ray et al. | 380/23 |
| 5,426,700 | 6/1995 | Berson | 380/23 |

FOREIGN PATENT DOCUMENTS

| | | | |
|---|---|---|---|
| 0268450 | 5/1988 | European Pat. Off. | G07F 7/08 |
| 0334616 | 9/1989 | European Pat. Off. | G07F 7/10 |
| 0609937 | 8/1994 | European Pat. Off. | G07F 7/08 |
| 9203804 | 3/1992 | WIPO | G07C 9/00 |

OTHER PUBLICATIONS

U.S. Department of Commerce Publication FIPS PUB180, "Secure Hash Standard", issued May 11, 1993, (category: Computer Security).

*Primary Examiner*—Bernarr E. Gregory
*Attorney, Agent, or Firm*—Edward Dugas

[57] ABSTRACT

Multiple validations of printed documents incorporating image information and authorizing data on a printed document assist in the printed document validation process. This technique requires the authorized document holder to have an image identification accompany the application or production of the document. Image information is converted to a storable image that is used in one of a plurality of validating schemes that assures that the presenter of the printed document is not a substitute. Such schemes included visual comparison of the printed document presenter and extracted image information and validation that the data has not been altered. Non-reversible encryption of the data, as it is read from the document at the document presentation site is used to formulate encoded authorization data that is then compared against like encoded authorized document holder data stored at a centrally located data base.

18 Claims, 4 Drawing Sheets

METHOD AND APPARATUS FOR IMAGE-BASED VALIDATIONS OF PRINTED DOCUMENTS

FIELD OF THE INVENTION

The present invention is a method and system for validation of image data representing the authorized user of a plurality of documents where the image data and the document identification data is read and encoded in order to be compared against previously stored image data.

BACKGROUND OF THE INVENTION

Visual verification of identity plays a role in many types of transactions and security procedures. For example, signatures, fingerprints, or images of faces are compared in order to establish identity. The creation of a fraudulent identity or the misrepresentation of identity allows individuals to commit fraud and breach security systems.

A large number of fraudulent documents are created annually. Examples are counterfeited checks, public assistance documents, and driver's licenses. Checks in particular represent a common means of conducting financial transactions where the check is a financial instrument that can be used to draw upon funds deposited in a financial institution such as a bank or credit union. In the United States the amount of fraudulent checks for retail sales is estimated to be $10 billion in 1993. A large portion of this cost is absorbed by retailers, a smaller portion by banks, and ultimately by consumers in the form of higher prices. Fraud on all forms of printed documents is difficult to quantify, though the loss to legitimate business and governmental activities is significant.

To reduce the exposure to bad checks many merchants require alternative sources of identification, such as a driver's license, and rely upon check validation services. The second form of identification is easily defeated by a determined thief and is an inconvenience for the majority of consumers. In fact, a forger capable of counterfeiting a check is likely to be able to counterfeit a driver's license as well. The check validation services offer only limited protection, in that it assures only that the check is written against a valid account. This does not assure that the check is written by the account holder, or that the check has not been counterfeited.

In the area of public assistance, fingerprinting and requalifying recipients is done frequently. This cost detracts from the funding of the legitimate purposes of these programs. These fraud deterrent practices are also unpopular and politically sensitive.

Methods used to combat this fraud have been the use of specialized papers that prevent erasures or the use of special printing inks which are not readily available. Some checks, such as traveler's checks require the bearer to sign the checks when issued and then countersign them upon redemption.

In order for a verification to be successful there has to be measures which occur both at the document presentation site as well as through the denial of the document validity via a modification of current on-line check approval process. A method for the validation of image data has been proposed for credit cards (see Lawrence A. Ray and Richard N. Ellson, "Method And Apparatus For Credit Card Verification," U.S. Pat. No. 5,321,751, issued Jun. 14, 1994). The method validates the image and account data stored on the magnetic stripe of credit cards by encoding this information and comparing it with information at a remote validation site. Most printed documents, unlike credit cards, do not possess magnetic stripes for storing image data. For image-based validation to work with printed documents such as checks, a method is needed to store readable image information in a printed form.

Credit card and checks undergo very different transformations in the course of executing a transaction. Physically, a credit card is unchanged. The card is designed to be used many times, and with the exception of wear and tear, the card is not altered by use. A check, however, is a "single-use" document. The process of writing a check changes the check and makes the check unusable for another transaction. Hence, in general, books of checks are printed at one time and issued to the authorized checking account holder in order for the account holder to have repeated access to the checking account. The checks within a check book differ only by a serial number which typically printed in the upper right hand corner and on the MICR line at the bottom of the check. This enables each check to be identified individually. What is needed is a method and apparatus to take advantage of this document identification data to provide image-based validation for a plurality of printed documents issued to an authorized user.

SUMMARY OF THE INVENTION

The present invention is directed to overcoming one or more of the problems set forth above. Briefly summarized, according to one aspect of the present invention, a printed document validation system comprising:

a plurality of printed documents each having data recorded thereon representing the image of at least one authorized user and document identification data;

reader means for reading the data recorded on said printed document;

algorithm means for providing a non-reversible encryption algorithm for encoding portions of the data;

a first processor means for encoding the data read from said printed document with the provided non-reversible encryption algorithm;

means for displaying the image representing the authorized user;

a storage means having stored therein data corresponding to the image data recorded on said printed document;

and a second processor means for receiving the document identification data and at least portions of the encoded data from said first processor, and accessing the image data associated with said printed document from said storage means, and for said second processor means to process said associated image data and portions of received data to form second processor encoded data, and comparing portions of received encoded data with said second processor encoded data to provide a validation signal when a correspondence is detected.

The present invention is a means of printing image information onto a printed document and using that information to assist in the validation process. The present invention consists of a plurality of printed documents each having data recorded thereon representing the image of at least one authorized user and document identification data. When the document is read at a document presentation site (e.g., the point of sale), the image is displayed and both the image data and document identification data are encoded by a non-reversible encryption algorithm. This information is then compared with similarly processed information stored at a remote site. If a correspondence is detected, a validation signal is transmitted from the remote site to the document presentation site.

The above and other objects of the present invention will become more apparent when taken in conjunction with the following description and drawings wherein identical reference numerals have been used, where possible, to designate identical elements that are common to the figures.

ADVANTAGEOUS EFFECTS OF THE INVENTION

The present invention has the following advantages: information concerning the validity of the document is doubly validated, at the document presentation site and at a remote, trusted site. Moreover, for the document to be validated, the same image information would have to be held by both the DVA and the printed document. The algorithm to validate the document would be modified by a document tampering, then the information used by the IVV algorithm would be different than the data available to the DVA and the IVV algorithm would produce a different result, invalidating the document. Moreover, since the algorithm selected randomly for each validation requester, attempting to circumvent the algorithm by clever re-encoding would also be thwarted, making fraudulent documents harder to produce. Also, knowledge that bearers of fraudulent documents would have their images captured will also be a deterrent, much like video cameras in banks.

Unlike other forms of printed document verification, the means of verification is largely transparent to the printed document holder. The method is non-intrusive and consumer friendly. There is also only a limited amount of printed space on the document needed to implement the present invention.

In the case of documents being checks, the cost of this would be recovered by the reduction of fraudulent purchases being made upon checks. Since this cost is borne by the merchant, the savings that result immediately improve the profitability of the merchant or the merchant can reduce prices to the customer.

The cost of producing documents in order to have the visual validation will only increase for the processing of the authorized document holder's image. In the case of checking, the printing of the check should be identical, as the image information is encoded as a two-dimensional bar code and can be printed with resolutions as coarse as 240 dots per inch.

Another advantage is that the authorized document holder will not be required to carry any additional information, such as a PIN number to corroborate the validity of the check of have a secondary identification, such as a driver's license. In the case where the document is a check, this will make the acceptance of the checks easier, as the validation comes with no significant inconvenience to the consumer.

The equipment necessary to perform this validation will not be significantly different that which is currently in place. In the case of checks, a check reader and a connection to a check validation agency is required. This is very similar to current practices though without the advantage of the secondary validation.

DETAILED DESCRIPTION OF THE INVENTION

Figure 1:
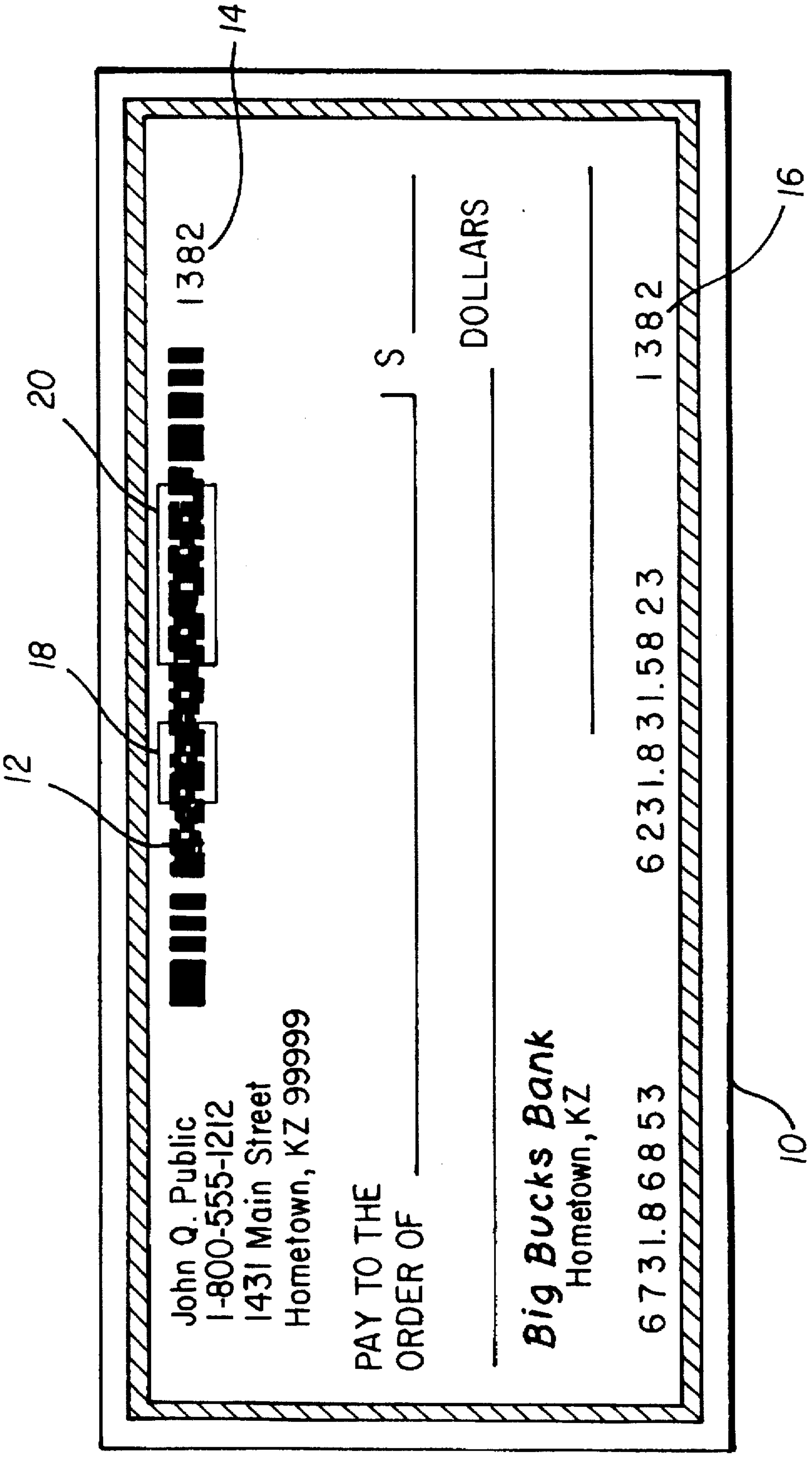
FIG. 1 is a printed document, in check form, containing readable data representing the image of the authorized user and document identification.

Referring to FIG. 1, a sample printed document 10 is shown in the form of a standard bank check. Printed on the front of the check is a bar code 12. The bar code 12 represents information with a structured sequence of lines in a two-dimensional pattern, such as the PDF417 Code of Symbol Technologies of Bohemia, N.Y. The bar code 12 contains image data 20 relating to an image of an authorized document holder. The image data 20 may be in compressed form. The bar code 12 may also contain document identification data 18 for distinguishing the document from other documents issued to the same authorized user. The document identification data 18 may be the check sequence number. Although the bar code 12 is shown in the upper right hand corner of the check 10 it is obvious that other locations are also acceptable. In the case of a standard personal check, the check surface area is about 16 square inches on the front and likewise on the back, with most of this surface area being suitable for printing the bar code 12. Another feature printed on the check is the check sequence number, which is located in the upper right hand corner 14, as well as in a MICR line 16, and may appear in the document identification data 18 within the bar code 12.

Figure 2:
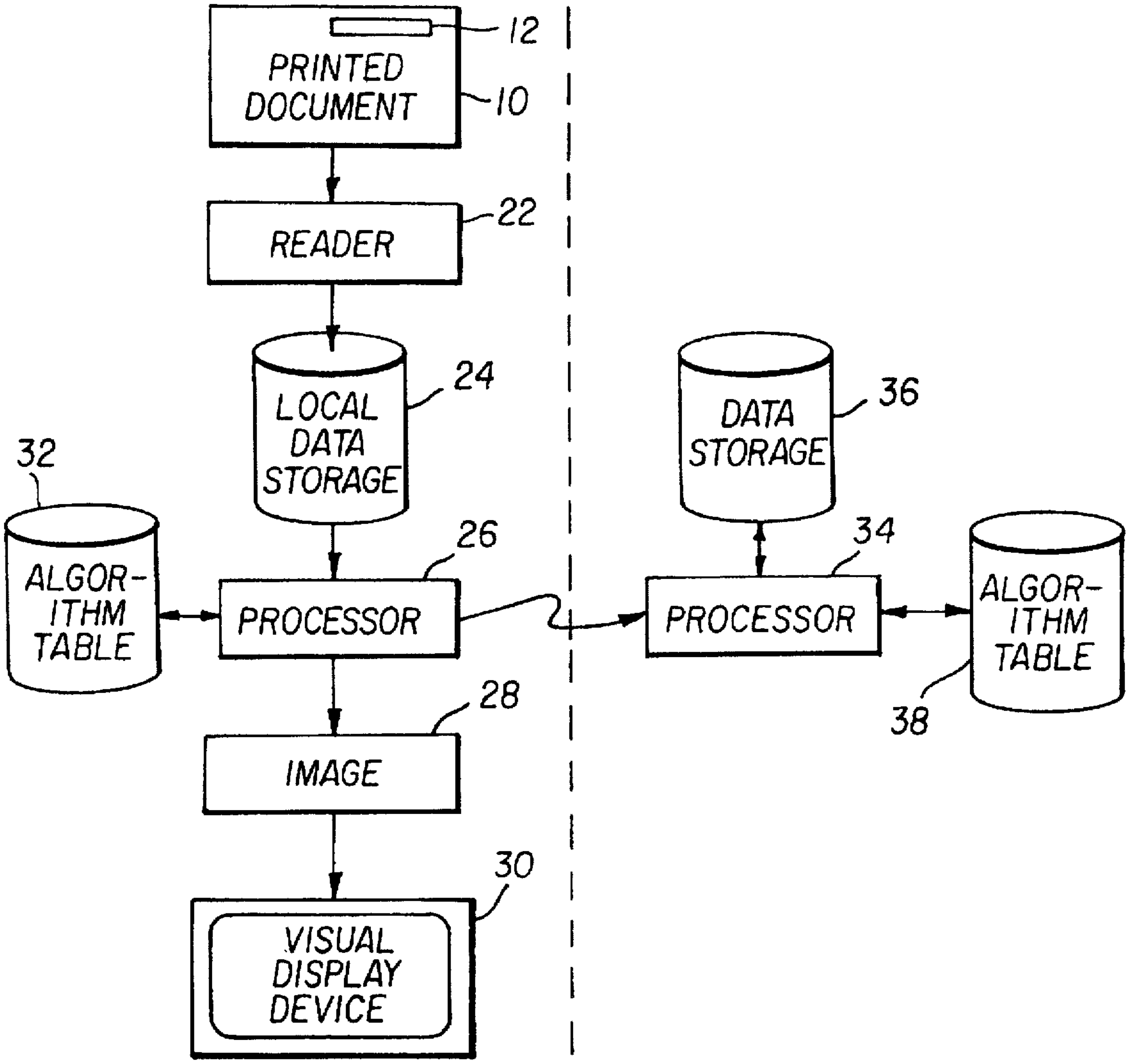
FIG. 2 is a block diagram illustrating the arrangement of the apparatus for performing the method of the present invention.

Referring to FIG. 2, all or part of the data, such as the bar code 12, that may be printed on the document 10, is read by a document reader 22. An example of such a document reader is a PDF-1000 manufactured by Symbol Technologies, Bohemia, N.Y. This data is retained in a local data storage device 24. The data is accessed and processed in several ways by a processor 26. The first process, if necessary, is to decompress the image data 20 resulting in a digital image 28. The digital image is then displayed on a display device 30 for viewing by an operator located at a document presentation site. The operator views the displayed image to determine if the authorized image is a reasonable likeness to the individual presenting the document. Additionally and/or alternatively, the authorized image may contain a signature, and/or a fingerprint. Another processing path takes the data in the data storage device 24 and calculates an image-validation-value (IVV) based upon an algorithm 32, embedded in the processor 26. The selection of the algorithm 32 by the processor 26 may be performed by a number of methods. Selection methods will be described in detail in the description of FIG. 3. The Document Validation Agency (DVA) recovers the data through a processor 34 at the DVA. The processor 26 transmits the IVV and document identification data 18 to processor 34. The processor 34 receives the data transmitted from processor 26 and retrieves information regarding the document holder from a data storage area 36. Included in the data is the image information that was printed on the document. The processor 34 having knowledge of the document identification data from the transmitted data from processor 26, processes the image data with the selected algorithm 38 to form another image validation value (IVV) and compares that IVV with the IVV transmitted from processor 36. The processing at the DVA optionally could be pre-computed and stored as a look-up-table which accompanies the information concerning the account. This would eliminate the need to recover the image information for each document validation being processed, as well as speed the response to the validation process. If a match is made, then a document validation signal is sent to the validation requester which permits the document to be validated.

In the situation where a validation requester has confirmed that the document presented has a strong likeness to the reconstituted image and the IVV from the document presentation site does not match the IVV computed at the DVA, then image data from the printed document can be transmitted from the document site to the DVA as it should provide a good image representation of the invalid document presenter. One embodiment of the present invention has the DVA automatically request the image information be transmitted from the document presentation site to the DVA, where the reconstituted image is stored and optionally forwarded to law enforcement agencies.

Figure 3:
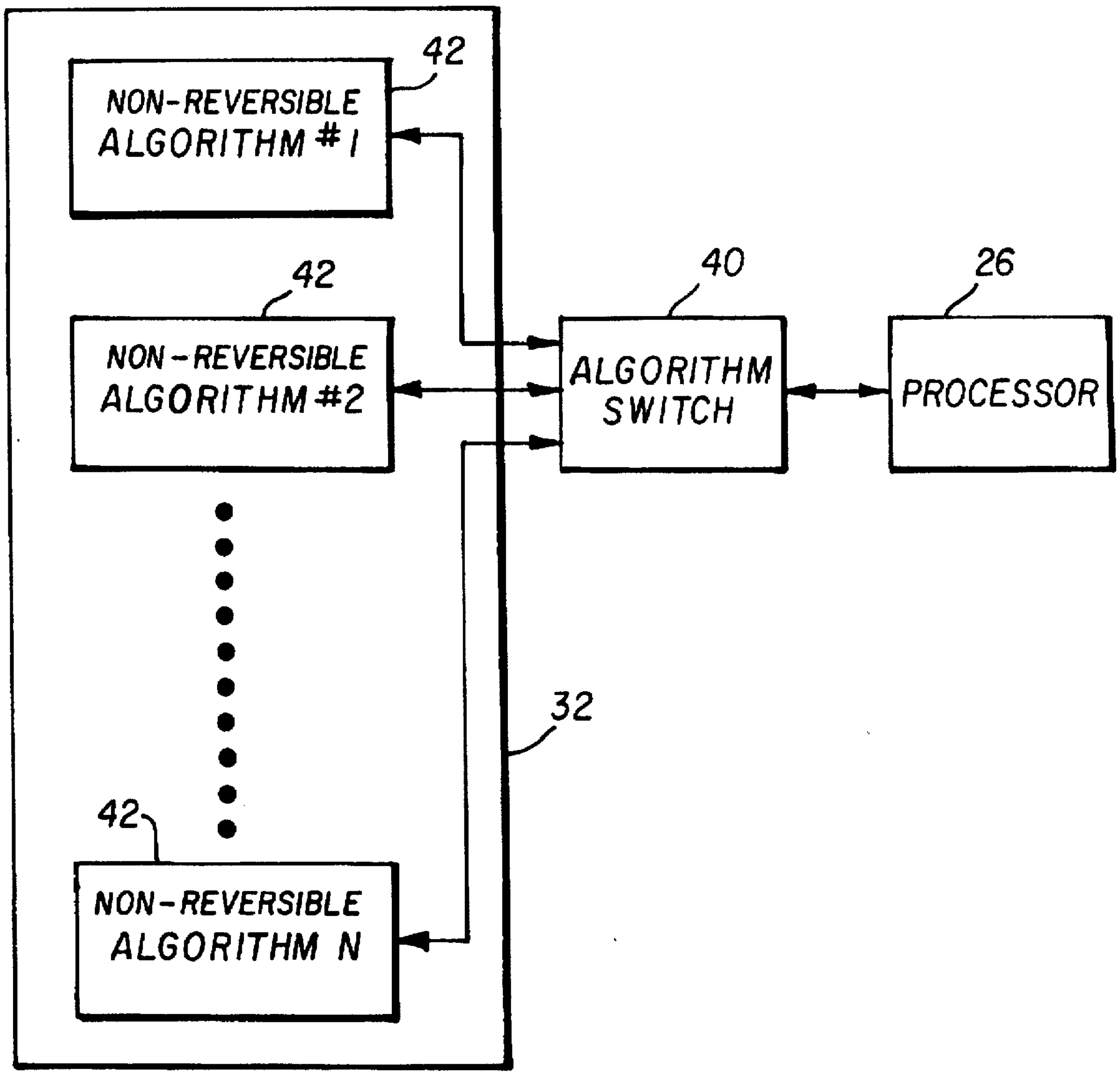
FIG. 3 is a block diagram illustrating a selection process for non-reversible encryption algorithms.

Referring to FIG. 3, a block diagram of a selection process for the encryption algorithm is illustrated. A processor 26 selects an algorithm to be used in the encryption process. The processor 26 indicates the selection through an algorithm switch 40 which extracts the indicated algorithm from an algorithm table 32. The algorithm table 32 consists of a plurality of algorithms 42. In the preferred embodiment of the present invention, the algorithm table 32 should contain algorithms 42 which are non-reversible encryption algorithms since in the present invention the input data to the encryption algorithm does not have to be reconstructed from the output of the encryption algorithm. As used herein, the term "non-reversible encryption algorithm(s)" will be understood by those skilled in the art to include a "one-way" or "trap door" algorithm(s), since technically speaking, as is well known in the art, that no encryption function is absolutely non-reversible. This also enables the size of the output of the encryption to be a smaller data length than the input, which is preferred in order to reduce transmission time. An example of such a non-reversible algorithm, which is computationally efficient and based upon the data in the compressed image format, is achieved by applying the Secure Hashing Algorithm (see FIPS PUB 180 by the U.S. Department of Commerce) and then extracting a substring of bits. The substring extraction is determined by a pseudo-random process, where the seed is derived from the two most significant digits of the transaction amount or the three least significant digits contained in the document identification data 18. The choice of algorithm can be done by various other means. Besides having all processors 26 capable of producing results for all algorithms, a single algorithm may be placed in a processor by the DVA. Another approach would be to have an algorithm selection code to be sent by the document validation agency and then have the processor 26 process a corresponding algorithm. Still another variation would be for the processor 26 to process some set of algorithms, which produces a sequence of validation codes. Moreover, as part of the validation procedure, the validation requester accesses the document data base 36 and transmits the validation requester identification number, which determines which algorithm the processor 26 has is accessing, the document identification data, and the result of the algorithm operation.

Another embodiment of the present invention has the image data residing with the DVA only. Once the validation requester requests document validation, encoded image data is transmitted to the validation requester which image data can be displayed on a monitor. The validation requester performs a visual comparison of the person presenting the document to the image displayed on the monitor. This would reduce the information storage requirements on the document, but would increase the volume of data transmitted between the document presentation site and the DVA.

In the case where a document has been damaged beyond recovery, of the data by means such as error correcting codes, then a back-up method is for the document validation requester to manually key the document identification data and to request the image data be sent from the DVA. An alternative image data format may be preferred if coded data interception is possible. Moreover, the DVA will be alerted to either a document presenter with a damaged document, or a document being used for fraudulent purposes.

Of course, the previous two methods can be used in combination to further insure the printed document has not been tampered.

The image data and/or information extracted from that image data is encoded and printed onto the document by means of a two-dimensional bar code such as the PDF417 by Symbol Technologies. This information can be used by the validation requester at the document presentation site to recover, for display, a picture of the document holder on a display device as a quick visual means for the validation requester to verify the validity of the document. In addition, as part of a validation procedure, each validation requester has, or is sent, an identification code which selects the algorithm to be accessed by the processor 26, which algorithm is then applied to the image data encoded on the document in order to generate an image-validation-value (IVV). This code may also be responsive to other information specific to the circumstances of the document presentation such as the date and time of the presentation.

Figure 4:
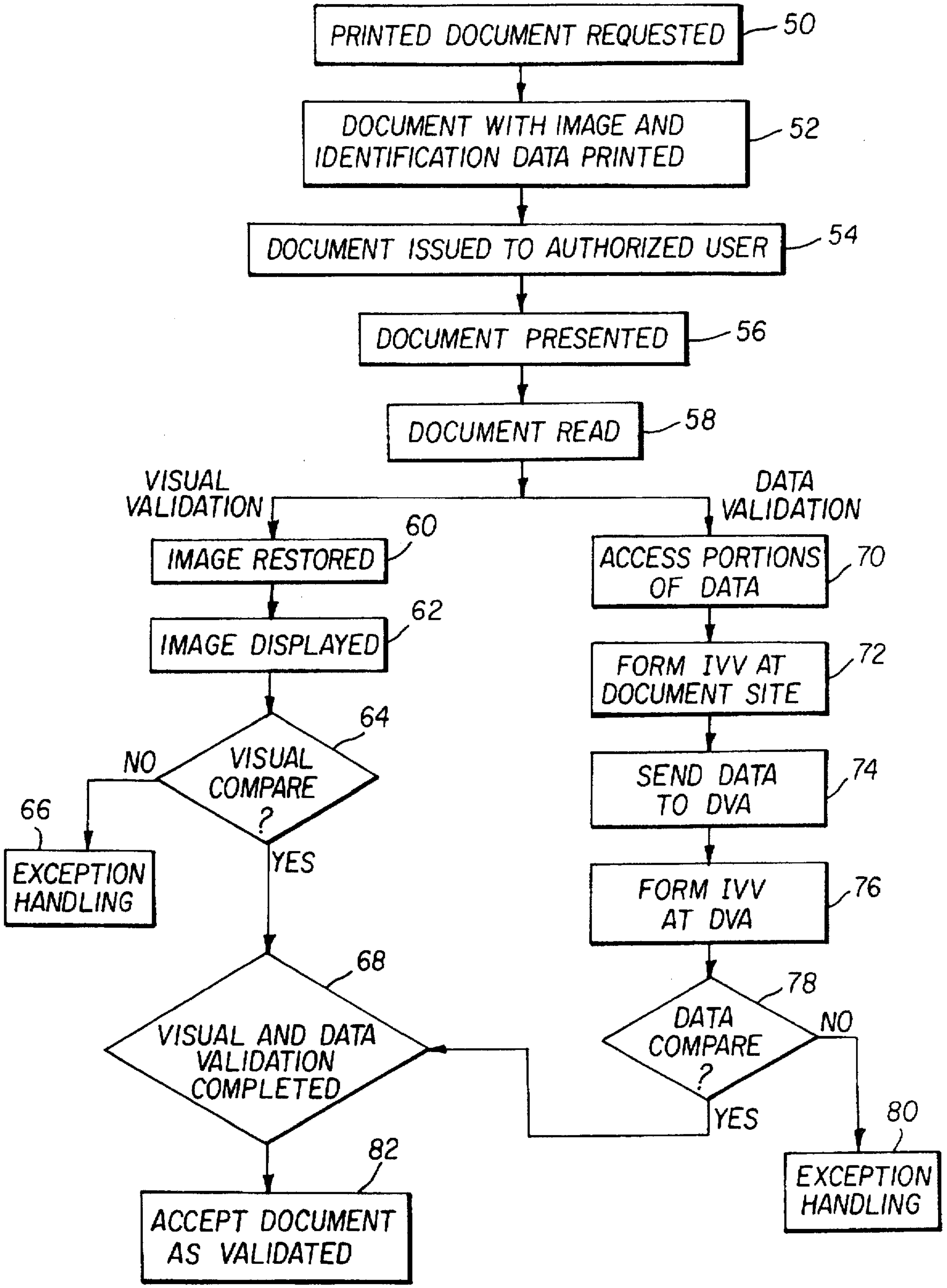
FIG. 4 is a flow chart of the method of operation for the present invention.

Referring to FIG. 4, a flow chart of the method of operation of the present invention is illustrated. In block 50, the document holder requests the issuance of a printed document 20 and provides information for the printed document comprised of at least image information. The document with the image information and the assigned document identification data 18 is printed in block 52. Printed documents are issued to the authorized document holder in block 54. In the next step, block 56, the document holder presents the document at the document presentation site. The document is read in block 58. Two paths follow from block 58, a visual validation path and a data validation path. These processes occur in parallel and rejoin at block 68.

The visual validation path proceeds from block 58 to block 60 where the image data is processed into digital image data by possible decompression. Next, in block 62, the image data is displayed on a display device and viewed. In block 64, the operator compares the image of the authorized document holder now on the display with the document presentor. If the operator determines that the image of the authorized document holder fails to correspond to the appearance of the document presentor, then an exception process, block 66, is initiated. If the operator determines their exists a reasonable correspondence, then the visual validation path is completed and joins with the end of the data validation path at block 68.

The data validation path begins at block 70 with the extraction of portions of the read data from the local data storage 24. In block 72, the processor 26 encodes the data as described above to produce an IVV. This IVV and at least the document identification data is sent in block 74 to the processor 34 at the document validation authority. In block 76 another IVV is generated from the document identification data received and the retrieved image data of the authorized user from the data storage device 36. The two IVV's are compared in block 78. If the values do not match, in block 80 an exception handling process is initiated. For example, an exception handling process may consist of sending a non-validation signal to processor 26 at the document presentation site. Another example is for processor 34 to request processor 26 to transmit the image data to processor 34. If the comparison in block 78 yields a match, then a validation signal is sent to processor 26 at the document presentation site as shown in block 68. This terminates the data validation path. The path now rejoins with the visual validation path in block 68.

Block 68 waits for the successful completion of both the visual and data validations. When both validation signals are positive, the document is accepted and confirmed as having been presented by the authorized document presentor in block 82.

The invention has been described with reference to a number of preferred embodiments. However, it will be appreciated that variations and modifications can be effected by a person of ordinary skill in the art without departing from the scope of the invention.

PARTS LIST

10 Printed document
12 Bar code
14 Document Sequence Number
16 MICR line
18 Document identification data
20 Image data
22 Printed document reader
24 Local data storage
26 Document site processor
28 Digital image
30 Visual display device
32 Document site algorithm table
34 DVA processor
36 DVA data storage
38 DVA algorithm table
40 Algorithm switch
42 Non-reversible encryption algorithm
50 Printed document requested
52 Document printed
54 Document issued
56 Document presented
58 Document read
60 Image restored
62 Image displayed
64 Visual compare
66 Exception handling
68 Validations complete
70 Access data
72 Form IVV
74 Send data
76 Form IVV
78 Data compare
80 Exception handling
82 Accept document

We claim:

1. Printed document validation system comprising:

a plurality of printed documents each having data recorded thereon; in a first section, image data representing the image of at least one authorized user, and in a second section, document identification data;

reader means for reading the data recorded from a selected one of the plurality of the printed documents;

means for displaying the image of at least one authorized user;

encryption algorithm means for encrypting portions of the image data read from the selected document by said reader means;

a first processor means for encrypting the portions of the image data read from the selected document by said reader means using said encryption algorithm means;

a storage means having stored therein data corresponding to the data recorded on said plurality of printed documents; and a second processor means for receiving the second section, document identification data, and at least a portion of the encrypted image data from said first processor, and accessing the image data associated with said selected printed document from said storage means, and for processing said associated image data to form second processor encrypted data, and associated image data and portions of received data to form for comparing portion of the received encrypted data with said second processor encryption data to provide a validation signal when a correspondence is detected.

2. The printed document validation system according to claim 1 wherein said encryption algorithm means providing a plurality of different encryption algorithms for selectively encrypting portions of the data.

3. The printed document validation system according to claim 2 wherein the selection of one of a plurality of encryption algorithms is pseudo-random.

4. The printed document validation system according to claim 2 wherein said second processor selects one of the plurality of algorithms for said first processor means.

5. The printed document validation system according to claim 1 wherein said second processor means requests the image data stored on said selected printed document for the case where a correspondence is not detected.

6. A document validation system comprising:

a plurality of printed documents each having data recorded thereon representing the image of at least one authorized user, document identification data, and authorizing data;

reader means for reading the data recorded on a selected one of said printed documents;

first encryption algorithm means for encrypting portions of the data from the selected document;

a first processor means for encrypting the data read from said selected printed document with the provided first encryption algorithm means;

means for displaying the image representing the authorized user;

a second processor means for receiving the selected document identification data and portions of the encrypted data from said first processor;

a storage means having stored therein data corresponding to the authorizing data recorded on said selected printed document; and second encryption algorithm means for encrypting portions of the data accessed from said storage means and for providing said encrypted portions to said second processor means for comparison with the received portions of the encrypted data from said first processor, said second processor providing a validation signal when a correspondence is detected.

7. The printed document validation system according to claim 6 wherein said first and said second encryption algorithm means is comprised of a plurality of selectable encryption algorithms.

8. The printed document validation system according to claim 7 wherein said second processor selects the encryption algorithm for said first processor means.

9. The printed document validation system according to claim 6 wherein said second processor means requests the image data stored on said selected printed document for the case where a correspondence is not detected.

10. A method for validating a printed document comprising the steps of:

a) forming an image of an authorized printed document user on a plurality of printed documents along with document identification data and authorizing user data;

b) reading the data recorded from a printed document;

c) displaying the image of an authorized user represented by the image data;

d) visually determining if a match exists between the displayed image and the selected printed document user;

e) encrypting portions of the data with an algorithm if a match exists;

f) establishing a central data base for a multiplicity of document users wherein encrypted authorized user data is stored;

g) comparing the encrypted portions of the data with encrypted authorized user data and document identification data to determine if a match exists; and h) sending a validation signal indicating the existence of a match.

11. A printed document validation system, comprising:

a) a plurality of printed documents having data recorded thereon representing a photograph of an authorized user and document identification data;

b) first validation means for validating the authenticity of a user including means responsive to said data for displaying the photograph representing the authorized user to a validation requester at a document presentation site; and c) second validation means for validating the authenticity of a selected printed document, including means for matching a document validation value generated at the document presentation site by encrypting a portion of the data and the document identification data, with a document validation value produced at a document validation agency.

12. The printed document validation system claimed in claim 11, wherein said means for matching includes:

a) first processor means located at the document presentation site for applying an encryption algorithm to a portion of said data to produce a document validation value; and b) second processor means located at said document validation agency for producing a document validation value generated from applying said encryption algorithm to data stored at said document validation agency.

13. The printed document validation system claimed in claim 12, wherein said encryption algorithm is selected from a plurality of encryption algorithms and further comprising means for transmitting a validation requester identification code identifying a selected encryption algorithm from said document presentation site to said document validation agency.

14. The printed document validation system claimed in claim 12, further comprising means for transmitting said document validation value, said validation requester identification code and a printed document number from said document presentation site to said document validation agency.

15. The printed document validation system claimed in claim 14, wherein said second processor means includes:

a) a memory containing a table of pre-generated document validation values associated with particular printed document numbers and validation requester identification codes;

b) means for retrieving a particular document validation value from said table; and c) means for comparing said retrieved document validation value with said transmitted document validation value.

16. The printed document validation system claimed in claim 14, wherein said second processor means includes:

a) a memory containing data representing a photograph of an authorized user, associated with a user printed document number, and a plurality of encryption algorithms associated with validation requester identification codes;

b) means for retrieving data and an encryption algorithm from said memory, and applying said retrieved algorithm to said retrieved data to produce a retrieved document validation value; and c) means for comparing said transmitted document validation value with said retrieved document validation value.

17. The printed document validation system claimed in claim 11, further comprising means for capturing and storing said data from said document if said second validation means fails to match said document validation values.

18. A printed document validation system, comprising:

a) a plurality of printed documents having data recorded thereon representing the image of at least one authorized user and printed document identification data;

b) reader means for reading the data recorded on a selected printed document;

c) means for applying an encryption algorithm to the data read from the selected printed document to produce a document validation value;

d) means for transmitting said document validation value, said selected printed document identification data, and a validation requester identification number to a document validation agency;

e) means for displaying the image representing the authorized user to a validation requester at a document presentation site;

f) storage means located at said document validation agency having stored therein printed document numbers and data sufficient for producing retrieved document validation values;

g) means located at said document validation agency for receiving said transmitted selected document validation value, said printed document number, and said validation requester identification number and retrieving a document validation value from said storage means, for comparing said retrieved document validation value with said selected transmitted document validation value, and producing an approval code when said retrieved document validation value matches said transmitted pre-approved code; and h) means for transmitting said approval code to the validation requester at the documentation presentation site.

* * * * *

UNITED STATES PATENT AND TRADEMARK OFFICE

CERTIFICATE OF CORRECTION

PATENT NO. : 5,673,320

DATED : September 30, 1997

INVENTOR(S) : Lawrence A. Ray, Richard N. Ellson

It is certified that error appears in the above-identified patent and that said Letters Patent is hereby corrected as shown below:

Column 8, line 13 and 14, after "encrypted data, and" delete "associated image data and portions of received data to form".

Column 8, line 19, after "means" delete "providing" and insert --provides--.

Signed and Sealed this

Tenth Day of March, 1998

*Attest:*

BRUCE LEHMAN

*Attesting Officer*

*Commissioner of Patents and Trademarks*